United States Patent
Oram et al.

(10) Patent No.: US 11,059,744 B2
(45) Date of Patent: Jul. 13, 2021

(54) GLASSES HAVING IMPROVED DROP PERFORMANCE

(71) Applicant: CORNING INCORPORATED, Corning, NY (US)

(72) Inventors: Pascale Oram, Hammondsport, NY (US); Vitor Marino Schneider, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 747 days.

(21) Appl. No.: 15/617,302

(22) Filed: Jun. 8, 2017

(65) Prior Publication Data

US 2017/0355640 A1 Dec. 14, 2017

Related U.S. Application Data

(60) Provisional application No. 62/349,802, filed on Jun. 14, 2016.

(51) Int. Cl.
*C03C 21/00* (2006.01)
*C03C 3/097* (2006.01)
(Continued)

(52) U.S. Cl.
CPC ............ *C03C 21/002* (2013.01); *C03C 3/097* (2013.01); *C03C 4/18* (2013.01); *C03C 23/007* (2013.01);
(Continued)

(58) Field of Classification Search
None
See application file for complete search history.

(56) References Cited

U.S. PATENT DOCUMENTS 3,798,013 A 3/1974 Inoue et al.
6,472,068 B1 10/2002 Glass et al.
(Continued)

FOREIGN PATENT DOCUMENTS

EP 1291631 A1 3/2003
EP 3468932 A1 4/2019
(Continued)

OTHER PUBLICATIONS

Sglavo and Green, "Flaw-Insensitive Ion Exchanged Glass: II, Production and Mechanical Performance" J. Am. Ceram. Soc. (8) pp. 1832-1838, 2001.
(Continued)

*Primary Examiner* — David Sample
(74) *Attorney, Agent, or Firm* — Jeffrey A. Schmidt

(57) ABSTRACT

Chemically strengthened glass articles exhibiting superior resistance to damage when dropped onto an abrasive surface. The strengthened glass article has a stress profile in which the compressive and tensile stresses within the article vary as a function of the thickness t of the glass article. The stress profile has a first region extending from the surface of the glass article to a depth d1 into the glass, wherein $d1 \leq 0.025t$ or $\leq 20$ μm and has a maximum compressive stress of at least about 280 MPa at the surface, a second region extending from a depth of at least d1 to a second depth d2 and having a local compressive stress maximum, and a third region extending from a third depth d3 in the glass to a depth of compression DOC, wherein $d2 \leq d3$ and $DOC \leq 0.15t$. A method of strengthening a glass article to provide resistance to damage when dropped is also provided.

22 Claims, 10 Drawing Sheets

(51) Int. Cl.
*C03C 4/18* (2006.01)
*G06F 1/16* (2006.01)
*C03C 23/00* (2006.01)

(52) U.S. Cl.
CPC ........ *G06F 1/1656* (2013.01); *C03C 2204/00* (2013.01)

(56) References Cited

U.S. PATENT DOCUMENTS

| | | |
|---|---|---|
| 6,516,634 B1 | 2/2003 | Green et al. |
| 8,187,987 B2 | 5/2012 | Amin et al. |
| 8,193,128 B2 | 6/2012 | Hellmann et al. |
| 8,561,429 B2 | 10/2013 | Allan et al. |
| 8,576,262 B2 | 11/2013 | Mori et al. |
| 8,783,063 B2 | 7/2014 | Osakabe et al. |
| 8,854,623 B2 | 10/2014 | Fontaine et al. |
| 8,950,215 B2 | 2/2015 | Rappoport et al. |
| 9,156,724 B2 | 10/2015 | Gross |
| 9,346,703 B2 | 5/2016 | Bookbinder et al. |
| 9,359,251 B2 | 6/2016 | Bookbinder et al. |
| 2005/0250639 A1 | 11/2005 | Siebers et al. |
| 2009/0220761 A1 | 9/2009 | Dejneka et al. |
| 2010/0009154 A1* | 1/2010 | Allan ............... C03C 3/085 428/220 |
| 2010/0190038 A1 | 7/2010 | Osakabe et al. |
| 2010/0326657 A1 | 12/2010 | Hellmann et al. |
| 2012/0088067 A1 | 4/2012 | Rappoport et al. |
| 2012/0135153 A1 | 5/2012 | Osakabe et al. |
| 2012/0194974 A1 | 8/2012 | Weber et al. |
| 2012/0216565 A1 | 8/2012 | Allan et al. |
| 2012/0216569 A1 | 8/2012 | Allan et al. |
| 2013/0224492 A1* | 8/2013 | Bookbinder ......... C03C 23/007 428/410 |
| 2013/0236666 A1 | 9/2013 | Bookbinder et al. |
| 2014/0227524 A1 | 8/2014 | Ellison et al. |
| 2015/0030834 A1 | 1/2015 | Morey et al. |
| 2015/0147574 A1 | 5/2015 | Allan et al. |
| 2015/0166407 A1 | 6/2015 | Varshneya et al. |
| 2015/0259244 A1 | 9/2015 | Amin et al. |
| 2016/0122240 A1* | 5/2016 | Oram ............... C03C 3/097 428/220 |
| 2017/0022092 A1* | 1/2017 | DeMartino ......... C03C 3/093 |
| 2017/0158556 A1* | 6/2017 | Dejneka ............ C03C 21/002 |

FOREIGN PATENT DOCUMENTS

| | | |
|---|---|---|
| JP | 2011-527661 | 11/2011 |
| JP | 2015-500194 A | 1/2015 |
| JP | 2015-511573 A | 4/2015 |
| TW | 201341324 A | 10/2013 |
| WO | 2010/005578 A1 | 1/2010 |
| WO | 2013130653 A2 | 9/2013 |
| WO | 2015/077179 A1 | 5/2015 |
| WO | 2015/127483 A2 | 8/2015 |
| WO | 2017/030736 A1 | 2/2017 |
| WO | 2017/100399 A1 | 6/2017 |
| WO | 2017/218475 A1 | 12/2017 |

OTHER PUBLICATIONS

Sglavo et al. Flaw-Insensitive Ion-Exchanged Glass: I, Theoretical Aspects, J. Am. Ceram. Soc. (8) pp. 1827-1831, 2001.
International Search Report and Written Opinion of the International Searching Authority; PCT/US2017/037158 dated Aug. 11, 2017; 13 Pages; European Patent Office.
Brandenburg; "Stress in Ion-Exchanged Glass Waveguides"; Journal of Lightwave Technology; vol. LT-4; No. 10; Oct. 1986; pp. 1580-1593.
Sane et al; "Stress Buildup and Relaxation During Ion Exchange Strengthening of Glass"; J. Am. Ceram. Soc., 70 [2]; 86-89 (1987).
Sglavo et al; "Processing of Glasses With Engineered Stress Profiles"; Journal of Non-Crystalline Solids; 344 (2004), pp. 73-78.
Japanese Patent Application No. 2018565390; Machine Translation of the Office Action dated Jan. 22, 2020; Japan Patent Office; 6 Pgs.
European Patent Application No. 17731774.0 Third-Party Observation pursuant to Article 115 EPC dated Jun. 2, 2020; 2 Pages; European Patent Office.
European Patent Application No. 17731774.0 Third-Party Observation pursuant to Article 115 EPC dated May 5, 2020; 5 Pages; European Patent Office.
European Patent Application No. 17731774.0; Observations by third parties filed on Jan. 26, 2021; 6 Pages; European Patent Office.
Extended European Search Report and Search Opinion; 20181619.6; dated Dec. 2, 2020; 10 Pages; European Patent Office.
Japanese Patent Application No. 2018-565390 Notice of Reasons for Refusal dated Dec. 2, 2020; 10 pages; (5 pages of English Translation and 5 pages of Original Document) Japanese Patent Office.
Korean Patent Application No. 10-2019-7000634; Office Action dated Jan. 15, 2021; 11 Pages; Korean Patent Office.
Taiwanese Patent Application No. 106119636; Third Party Observation dated Oct. 7, 2020; 9 Pages; Taiwanese Patent Office.
Glass et al., "New Glass Technologies for Enhanced Architectural Surety®: Engineered Stress Profiles (ESP) in Soda-Lime-Silica Glass", Sandia National Laboratories, SAND2000-3001, Dec. 2000, 37 pages.
Green et al., "Crack Arrest and Multiple Cracking in Glass Through the Use of Designed Residual Stress Profiles", Science, Vol. 283, Issue 5406, Feb. 26, 1999, pp. 1295-1297.

* cited by examiner

GLASSES HAVING IMPROVED DROP PERFORMANCE

CROSS-REFERENCE TO RELATED APPLICATIONS

This application claims the benefit of priority under 35 U.S.C. § 119 of U.S. application Ser. No. 62/349,802 filed on Jun. 14, 2016, the content of which is relied upon and incorporated herein by reference in its entirety.

BACKGROUND

The disclosure relates to strengthened glass. More particularly, the disclosure relates to strengthened glass that is resistant to damage when dropped onto an abrasive surface.

Glasses strengthened by ion exchange tend to exhibit stress profiles that resemble a complementary error function or a parabolic function. While such stress profiles provide adequate protection for certain type of damage such as sharp impact, they do not provide sufficient protection for certain types of insult, such as a drop from a height onto an abrasive surface.

SUMMARY

The present disclosure provides chemically strengthened glass articles that exhibit superior resistance to damage when dropped onto an abrasive surface. The strengthened glass article has a stress profile in which the compressive and tensile stresses within the article vary as a function of the thickness t of the glass article. The stress profile has a first region extending from the surface of the glass article to a depth d1 into the glass, wherein d1≤0.025t or d1≤20 µm and the first region has a maximum compressive stress of at least about 280 MPa at the surface, a second region extending from a depth of at least d1 to a second depth d2 and having a local compressive stress maximum, and a third region extending from a third depth d3 in the glass to a depth of compression DOC, wherein d2≤d3 and DOC≥0.15t. A method of strengthening a glass article to provide resistance to damage when dropped is also provided.

Accordingly, one aspect of the disclosure is to provide a glass article. The glass article has a thickness t and a compressive layer extending from a surface of the glass to a depth of compression DOC. Stress in the glass article varies as a function of the thickness t to form a stress profile. The stress profile comprises: a first region extending from the surface to a depth d1 into the glass, wherein d1≤0.025t and wherein the first region has a maximum compressive stress CS1 of at least about 280 MPa at the surface; a second region extending from a depth of at least d1 to a second depth d2, wherein d2≤0.0625t, wherein the second region has a compressive stress maximum CS2, wherein 125 MPa≤CS2≤250 MPa or 50 MPa≤CS2≤300 MPa; and a third region extending from a third depth d3 in the glass to the depth of compression DOC, wherein d2≤d3 and DOC≥0.10t.

A second aspect of the disclosure is to provide a glass article. The glass article has a thickness t, a Young's modulus in a range from about 50 GPa to about 120 GPa, and a compressive layer extending from a surface of the glass to a depth of compression DOC. Stress within the glass article varies as a function of the thickness t to form a stress profile. The stress profile comprises: a first region extending from the surface to a depth d1 into the glass, wherein d1≤20 µm and wherein the first region has a maximum compressive stress CS1 of at least about 280 MPa at the surface; a second region extending from a depth of at least d1 to a second depth d2, wherein 20 µm≤d2≤50 µm, wherein the second region has a compressive stress maximum CS2, wherein 125 MPa≤CS2≤250 MPa or 50 MPa≤CS2≤300 MPa; and a third region extending from a third depth d3 in the glass to the depth of compression DOC, wherein d2≤d3 and DOC≥0.15t.

A third aspect of the disclosure is to provide a glass article having a thickness t, a Young's modulus in a range from about 50 GPa to about 120 GPa, and a compressive layer extending from a surface of the glass to a depth of compression DOC. Stress within the glass article varies as a function of the thickness t to form a stress profile comprising: a first region extending from the surface to a depth d1 into the glass article, wherein d1≤20 µm and wherein the first region has a maximum compressive stress CS1 of at least about 280 MPa at the surface; a second region extending from a depth of at least d1 to a second depth d2, wherein 20 µm≤d2≤50 µm, wherein the second region has a compressive stress maximum CS2, wherein 125 MPa≤CS2≤250 MPa or 50 MPa≤CS2≤300 MPa, wherein the stress profile increases from a compressive stress at the depth d1 to the compressive stress maximum CS2 and decreases from the compressive stress maximum CS2 to a second compressive stress at second depth d2; and a third region extending from a third depth d3 in the glass to the depth of compression DOC, wherein d2≤d3 and DOC≥0.15t.

A fourth aspect of the disclosure is to provide a method of strengthening a glass. The glass comprises first alkali cations and has a first surface, a second surface opposite the first surface, a thickness t, a center at t/2. The glass has a stress profile comprising a first region extending from the first surface to a depth d1 into the glass, wherein d1≤0.025t and having a maximum compressive stress CS1 at the surface, a second region extending from a depth of at least d1 to a second depth d2, wherein d2≤0.0625t and having a compressive stress maximum CS2, and a third region extending from a third depth d3 in the glass to the depth of compression DOC, wherein d2≤d3. The method comprises: immersing the glass in a first ion exchange bath comprising first alkali cations and second alkali cations, wherein the second alkali cations are different from the first alkali cations, and wherein the second alkali cations from the ion exchange bath replace the first alkali cations in the glass article, and wherein the first ion exchange bath comprises from about 20 wt % to about 30 wt % of sar least one salt of the first alkali cation; immersing the glass in a second ion exchange bath after immersing the glass article in the first ion exchange bath, wherein the second ion exchange bath comprises the first and second alkali cations, wherein the second ion exchange bath comprises from about 60 wt % to about 80 wt % of at least one salt of the first alkali cation; and immersing the glass in a third ion exchange bath after immersing the glass article in the second ion exchange bath, wherein the third ion exchange bath comprises from about 75 wt % to about 100 wt % of at least one salt of the first alkali cation.

These and other aspects, advantages, and salient features will become apparent from the following detailed description, the accompanying drawings, and the appended claims.

DETAILED DESCRIPTION

Figure 1:
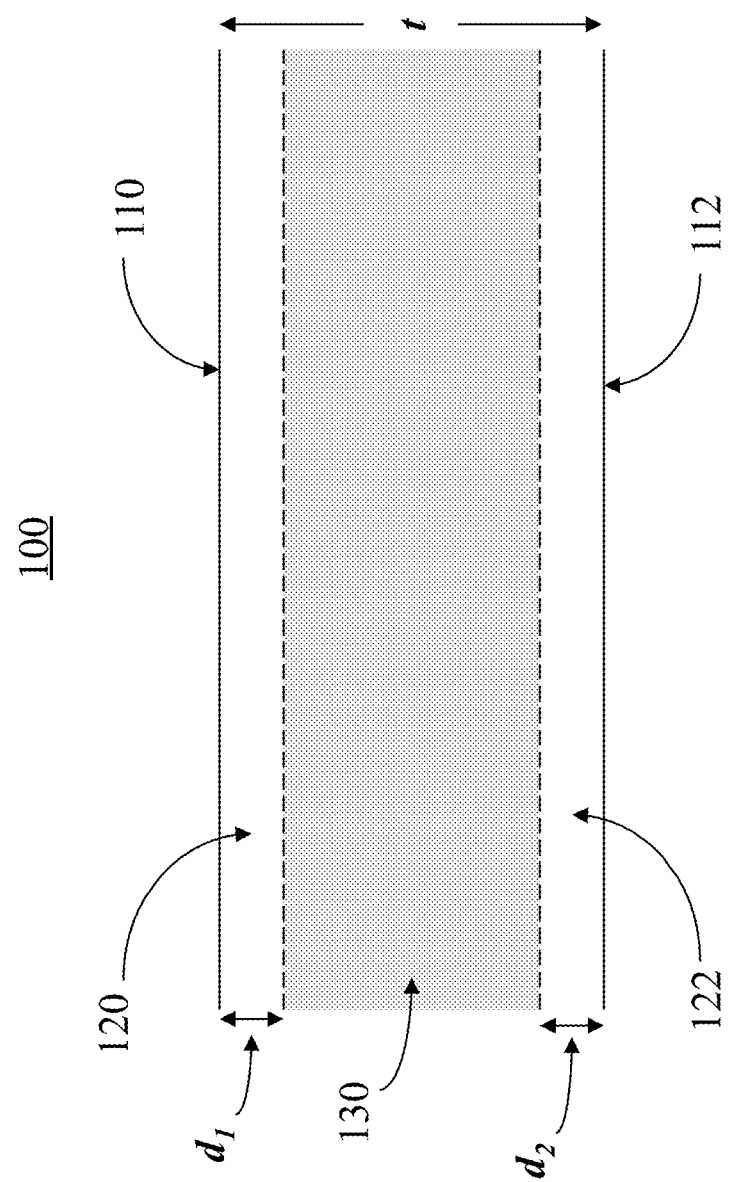
FIG. 1 is a schematic cross-sectional view of a strengthened glass article.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass article" and "glass articles" are used in their broadest sense to include any object made wholly or partly of glass or glass ceramic. Unless otherwise specified, all compositions are expressed in terms of mole percent (mol %).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "free of $Li_2O$" is one in which $Li_2O$ is not actively added or batched into the glass, but may be present in very small amounts (e.g., 400 ppm or less) as a contaminant.

Compressive stress are measured using those means known in the art. Such means include, but are not limited to, measurement of surface stress (FSM) using commercially available instruments such as the FSM-6000, manufactured by Orihara Co., Ltd. (Tokyo, Japan). Surface stress measurements rely upon the accurate measurement of the stress optical coefficient (SOC), which is related to the birefringence of the glass. SOC is in turn measured according to a modified version (hereinafter "the modification") of Procedure C, which is described in ASTM standard C770-98 (2013), entitled "Standard Test Method for Measurement of Glass Stress-Optical Coefficient," the contents of which are incorporated herein by reference in their entirety. The modification of Procedure C includes using a glass disc having a thickness of 5 to 10 mm and a diameter of 12.7 mm as the test specimen. The disc is isotropic and homogeneous, and is core-drilled with both major faces polished and parallel to each other. The modification also includes calculating the maximum force, F max to be applied to the disc. The force should be sufficient to produce compression stress of at least 20 MPa. F max is calculated using the equation:

$$F\,\text{max} = 7.854 \cdot D \cdot h$$

where: F max is maximum force, expressed in in Newtons; D is the diameter of the disc, expressed in millimeters (mm); and h is the thickness of the light path, also expressed in mm. For each force applied, the stress is computed using the equation:

$$\sigma(\text{MPa}) = 8F/(\pi \cdot D \cdot h)$$

where: F is the force, expressed in in Newtons; D is the diameter of the disc, expressed in millimeters (mm); and h is the thickness of the light path, also expressed in millimeters.

As used herein, the terms "depth of compression" and "DOC" refer to the depth within the strengthened glass at which the stress is effectively zero; i.e., the depth at which the stress within the glass transforms glass from compression to tension, or vice versa.

Stress profiles in chemically strengthened glasses may be deduced from measurement of refractive stress profiles for orthogonal polarizations of measurement light, with the difference in index profiles for both polarization states representing the birefringence. The stress profiles and central (or center) tension described herein are determined using the refractive near field (RNF) method. The RNF system and method utilize a reference block in contact with the glass article being measured. The stress profile of the chemically strengthened glass is measured by scanning a polarization-switched light beam through the glass to define a transmitted polarization-switched light beam. The method also includes measuring an amount of power in the polarization-switched light beam to form a polarization-switched reference signal. The polarization-switched light is detected and forms the polarization-switched detector signal, which is divided by the polarization-switched reference signal to obtain a normalized polarization-switched detector signal. The normalized signal is then used to determine the stress profile. Systems and methods for measuring the stress profile are described in U.S. Pat. No. 8,854,623 by Norman H. Fontaine and Vitor M. Schneider, entitled "Systems and Methods for Measuring a Profile Characteristic of a Glass Sample," filed Oct. 16, 2013, which claims priority to U.S. Provisional Patent Application No. 61/718,273, filed Oct. 25, 2012, the contents of which are incorporated herein by reference in their entirety.

The depth of compression DOC and the compressive stress below the surface may be determined from the stress profile obtained using the RNF method described above. Alternatively, the depth of compression DOC, center tension CT, and stress profile (which includes the compressive stress below the surface) may be determined using polarimetric methods and instrumentation known in the art. For example, a birefringence imaging microscope such as the EXICOR® BIREFRINGENCE MICROIMAGER™ (Hinds Instruments, Hillsboro Oreg. USA) may be used to evaluate the birefringence of strengthened glass and thus determine the depth of compression DOC, center tension CT, and stress profile. Electron microprobe analysis, which may be used to determine concentration profiles of elements within the strengthened glass, may also be used as a means for determining the depth of compression DOC and stress profile.

Described herein is a chemically strengthened glass article that exhibits superior resistance to damage when dropped onto an abrasive surface. The strengthened glass article has a stress profile in which the compressive and tensile stresses within the article vary as a function of the thickness t of the glass article.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

A schematic cross-sectional view of the strengthened glass article is shown in FIG. 1. Glass article 100 has a thickness t, first surface 110, and second surface 112. Glass article 100, in some embodiments, has a thickness t of from about 50 µm to about 3000 µm (3 mm). In some embodiments, thickness t is in a range from about 100 µm to about 2000 µm (2 mm) and, in other embodiments, from about 300 µm to about 1300 µm (1.3 mm). While the embodiment shown in FIG. 1 depicts glass article 100 as a flat planar sheet or plate, glass article 100 may have other configurations, such as a three-dimensional shape or non-planar configuration. Glass article 100 has a first compressive layer 120 extending from first surface 110 to a depth of compression (DOC) $d_1$ into the bulk of the glass article 100. In the embodiment shown in FIG. 1, glass article 100 also has a second compressive layer 122 extending from second surface 112 to a second depth of compression $d_2$. Unless otherwise specified, $d_1=d_2=DOC$. In some embodiments, the depth of compression DOC is at least about 0.10t (DOC≥0.10t) and, in some embodiments, at least about 0.15t (DOC≥0.10t). In some embodiments DOC is less than or equal to 0.25t (DOC≤0.25t). First and second compressive layers 120, 122 are each under a compressive stress CS. In some embodiments, first and second compressive layers 120, 122 each have a maximum compressive stress CS at the first and second surfaces 110, 112, respectively. Glass article also has a central region 130 that extends from $d_1$ to $d_2$. Central region 130 is under a tensile stress or physical center tension (CT), which balances or counteracts the compressive stresses of layers 120 and 122, is usually measured as the tensile stress at the center of the glass, or t/2. The depths of compression $d_1$, $d_2$ of first and second compressive layers 120, 122 protect the glass article 100 from the propagation of flaws introduced by sharp impact to first and second surfaces 110, 112 of glass article 100 into the center region 130, while the compressive stress minimizes the likelihood of a flaw penetrating through the depth $d_1$, $d_2$ of first and second compressive layers 120, 122.

Figure 2:
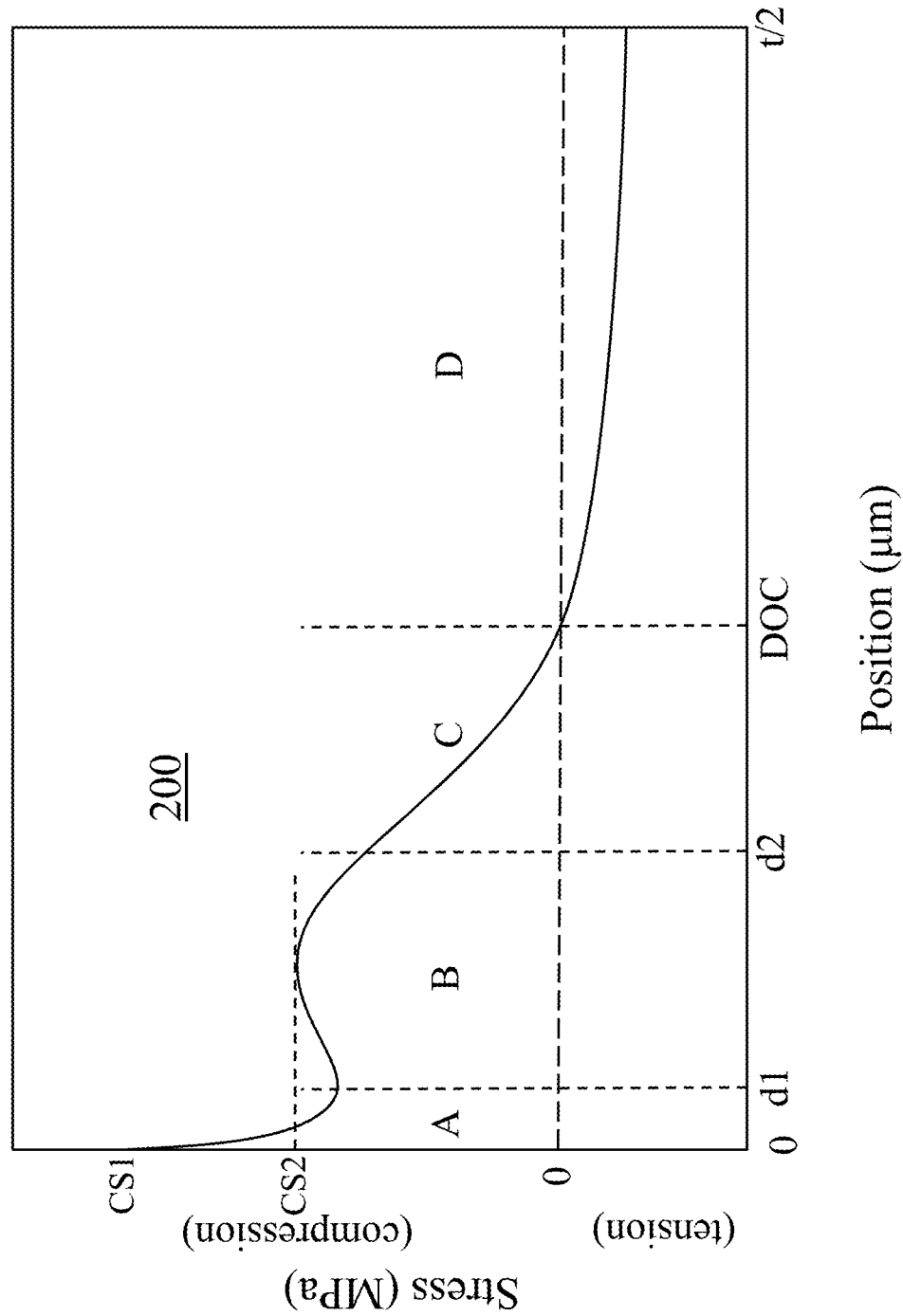
FIG. 2 is a schematic representation of a stress profile that may be obtained for a glass.

In one aspect, the strengthened glass article has a stress profile that varies as a function of thickness t. A schematic, non-limiting example of such a stress profile is schematically shown in FIG. 2. Stress profile 200 includes a first region A which, in some embodiments, provides a sharp increase or "spike" in compressive stress at and immediately adjacent to the surface. The first region A extends from a surface (110, 112 in FIG. 1) of the strengthened glass article 100 to a first depth d1 of at least about 0.007t (d1≥0.0t) or at least about 0.010t (d1≥0.010t) into the glass. In some embodiments, d1 is less than or equal to 0.025t (d1≤0.025t). Region A has a maximum compressive stress CS1 at the surface (position=0 µm in FIG. 2) of the glass article of at least about 280 MPa.

Stress profile 200 further includes a second region (region B in FIG. 2) under compression extending from a depth of at least d1 to a second depth d2 below the surface of the glass article, where d2 is less than or equal to about 0.0625t (d2≤0.0625t). In some embodiments, d2 is in a range from about 20 µm to about 50 µm (20 µm≤d2≤50 µm). The stress profile increases from a compressive stress at the depth d1 to a local compressive stress maximum CS2 and decreases from the compressive stress maximum CS2 to a second compressive stress at second depth d2. The "buried" local maximum CS2 occurs within region B at a depth greater than d1 and less than d2 beneath the surface of the glass, where CS1>CS2. In some embodiments, the local maximum compressive stress CS2 is in a range from about 125 MPa to about 250 MPa (125 MPa≤CS2≤250 MPa) or 50 MPa to about 300 MPa (50 MPa≤CS2≤300 MPa). Beyond the point where the local maximum CS2 occurs, the compressive stress decreases with increasing depth.

Stress profile 200 also includes a third region C(FIG. 2) under compressive stress. Third region C extends from a third depth d3 (not shown) below the surface, where d2≤d3, to the depth of compression DOC; i.e., d2≤d3<DOC. In some embodiments, the depth of compression DOC is at least about 0.10t (DOC≥0.10t) and, in some embodiments, at least about 0.15t (DOC≥0.10t). In some embodiments DOC is less than or equal to 0.25t (DOC≤0.25t).

Stress profile 200 further includes a tensile region (D in FIG. 2), which extends from the depth of compression DOC to the midpoint or center at one-half of the thickness t (t/2) of the strengthened glass article. In some embodiments, the tensile stress or physical center tension has a maximum absolute value of about 100 MPa at the center t/2 of the strengthened glass article. Alternatively, when using the convention that tensile stress is less than zero, the tensile stress has a minimum value of −100 MPa at t/2.

A three-step ion exchange process is used to achieve the stress profile 200 described hereinabove. Accordingly, a method of ion exchanging a glass to obtain the above stress profile is provided.

In a first step, a glass article comprising a first alkali cation is immersed in a first ion exchange bath. The first ion exchange bath comprises the first alkali cation and a second alkali cation, wherein the second alkali cation differs from and is larger in size than the first alkali cation. In some embodiments, the first cation is $Na^+$ and the second cation is $K^+$. The $Na^+$ and $K^+$ cations are introduced into all of the ion exchange baths described herein as salts such as halides, sulfate, nitrates, or the like. The nitrates $KNO_3$ and $NaNO_3$ are most commonly used. In some embodiments, the first alkali cation may include $Li^+$ as well as $Na^+$. In some embodiments, the second cation may include at least one of $K^+$, $Rb^+$, and $Cs^+$. In some embodiments, the first alkali cation may be $Li^+$ and the second alkali cation may include at least one of $Na^-$, $K^+$, $Rb^+$, and $Cs^+$.

In the first ion exchange bath, the salt of the first alkali cation comprises less than 50 wt % and, in some embodiments, from about 20 wt % to about 30 wt % of the bath, with the balance of the bath being the salt of the second alkali cation and small amounts (<5 wt %) of additives such as stabilizers and the like. The first ion exchange step is carried out at a temperature in a range from about 450° C. to about 470° C. for times ranging from about 18 hours to about 30 hours. In certain embodiments, the first ion exchange step is carried out at 460° C. for about 24 hours in an ion exchange bath comprising from about 20 wt % to about 30 wt % NaNO₃ and from about 70 wt % to about 80 wt % KNO₃.

Following ion exchange in the first ion exchange bath, the glass is immersed in a second ion exchange bath comprising the first alkali cation and the second alkali cation. The second ion exchange step replaces some of the second alkali cations near the glass surface, which were introduced in the first ion exchange step, with the first alkali cations. In those instances where the first alkali cation is Na⁺ and the second alkali cation is K⁺, for example, the second ion exchange step replaces some of the K⁺ ions near the glass surface with Na⁺ ions. The second ion exchange step thus serves to create local compressive stress and K⁺ concentration maxima "buried" beneath the surface of the glass article in region B (FIG. 2) of the stress profile, described hereinabove.

The second ion exchange bath comprises from about 60 wt % to about 70 wt % of the salt of the first alkali cation, with the balance of the bath being the salt of the second alkali cation and small amounts (<5 wt %) of additives such as stabilizers and the like. The second ion exchange step is carried out at a temperature in a range from about 450° C. to about 470° C. for times ranging from about 4 hours to about 8 hours. In certain embodiments, the second ion exchange step is carried out at 460° C. for about 6 hours in a bath comprising about 65 wt % NaNO₃ and about 35 wt % KNO₃.

After the second ion exchange step, the glass is ion exchanged in a third ion exchange bath. The third ion exchange step introduces an additional amount of the second alkali cation to the region at and immediately adjacent to the surface of the glass (first region A described hereinabove), thus creating a compressive stress maximum or "spike" at the surface.

The third ion exchange bath comprises 75 wt % to about 100 wt % of the salt of the second alkali cation, with the balance of the bath being the salt of the first alkali cation and small amounts (<5 wt %) of additives such as stabilizers and the like. The third ion exchange step is carried out at a temperature in a range from about 380° C. to about 400° C. for times ranging from about 0.15 hour to about 0.8 hour. In certain embodiments, the third ion exchange step is carried out at 390° C. for about 0.2 hour to about 0.6 hour in a bath comprising from about 15 wt % to about 25 wt % NaNO₃ and from about 75 wt % to about 85 wt % KNO₃.

In some embodiments, the glass articles described herein have a Young's modulus in a range from about 50 gigaPasacals (GPa) to about 120 GPa. In some embodiments, the Young's modulus is in a range from about 55 GPa to about 100 GPa and, in still other embodiments, in a range from about 60 GPa to about 90 GPa.

In some embodiments, the method further includes at least one thermal diffusion step in which the first and second alkali cations are allowed to diffuse deeper into the glass article. In some embodiments, the first alkali cation and the second alkali cation are allowed to diffuse from opposite surfaces of the glass until the diffused cations meet at the center of the glass at depth of t/2. The thermal diffusion step, in some embodiments, includes heating the glass to a temperature in a range from about 400° C. to about 500° C. for times ranging from 0.5 hour to 40 hours. The thermal diffusion step may take place between the first ion exchange step and the second ion exchange step and/or between the second ion exchange step and the third ion exchange step. Ion exchange parameters for the three-step ion exchange process described above are listed in Table 1. The glass samples used in the three-step ion exchange study had a thickness of 800 μm and a nominal composition of about 58 mol % SiO₂, about 16 mol % Al₂O₃, about 6 mol % P₂O₅, about 17 mol % Na₂O, and about 3 mol % MgO.

TABLE 1

Ion exchange parameters for the three-step ion exchange process.

| Sample | 1 | 2 | 3 | 4 |
|---|---|---|---|---|
| First ion exchange | | | | |
| Bath composition (wt %) | 20% NaNO₃ 80% KNO₃ | 30% NaNO₃ 70% KNO₃ | 25% NaNO₃ 75% KNO₃ | 25% NaNO₃ 75% KNO₃ |
| Temperature (° C.) | 460 | 460 | 460 | 460 |
| Time (hours) | 24 | 24 | 24 | 24 |
| Second ion exchange | | | | |
| Bath composition (wt %) | 65% NaNO₃ 35% KNO₃ | 65% NaNO₃ 35% KNO₃ | 65% NaNO₃ 35% KNO₃ | 65% NaNO₃ 35% KNO₃ |
| Temperature (° C.) | 460 | 460 | 460 | 460 |
| Time (hours) | 6 | 6 | 6 | 6 |
| Third ion exchange | | | | |
| Bath composition (wt %) | 20% NaNO₃ 80% KNO₃ | 15% NaNO₃ 85% KNO₃ | 20% NaNO₃ 80% KNO₃ | 25% NaNO₃ 75% KNO₃ |
| Temperature (° C.) | 390 | 390 | 390 | 390 |
| Time (hours) | 0.6 | 0.6 | 0.6 | 0.2 |

Statistical analyses of the surfaces of typical 180-grit and 30-grit sandpaper were performed in order to determine the performance of the strengthened glass articles when dropped onto an abrasive surface, and the average grain sizes—including dimensions and height—of the abrasive surfaces were analyzed. A statistical model was derived based on measurements of the dimension and height as well as density of features in the 180-grit and 30-grit sandpapers. A certain amount of energy will be transferred to the device for a given mass for a device, such as a hand-held electronic device that incorporates the glass described herein and drop height. Therefore, the optimal stress profile is, to a certain extent, a function of the distribution of features in the sandpapers used as surfaces in the drop tests.

Figure 3:
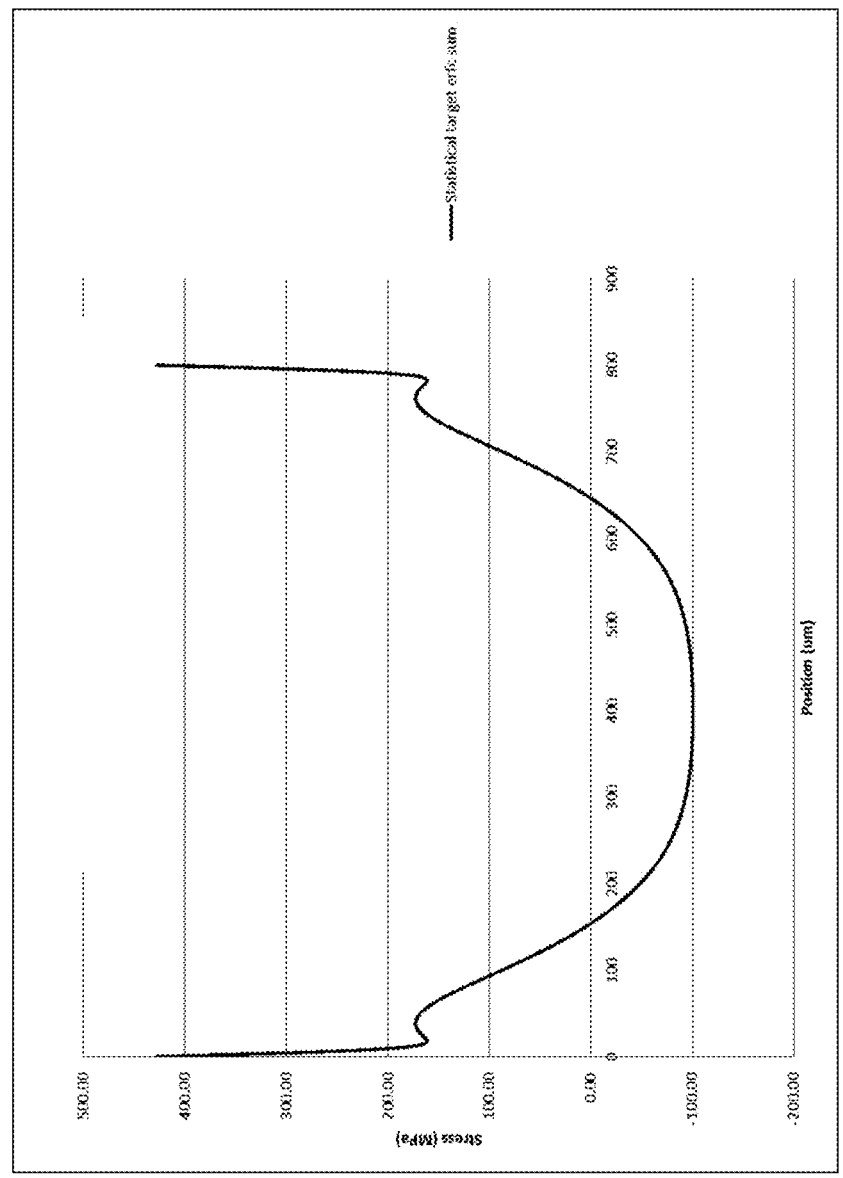
FIG. 3 is a plot of a statistical target for the stress profile for optimum drop performance of a glass article.

The statistical target for the stress profile based on the surface morphology of the 30-grit and 180-grit sandpapers for optimum drop performance of a glass article having a thickness of 800 μm is shown in FIG. 3. Although incomplete, the analogy leads to a unique stress profile target that cannot be readily realized by either a single-step (SIOX) or two-step ion exchange (dual IOX or DIOX) processes. However, a three-step (triple IOX or TRIOX) ion exchange process is capable of closely approximating the empirical target profile. The target stress profile is also a function of the Young's modulus of the material. The target stress profile for glasses having a Young's modulus of about 65 GPa shown in FIG. 3 is an idealized profile that was calculated using a statistical model that is based on three error functions (erfc).

Figure 4:
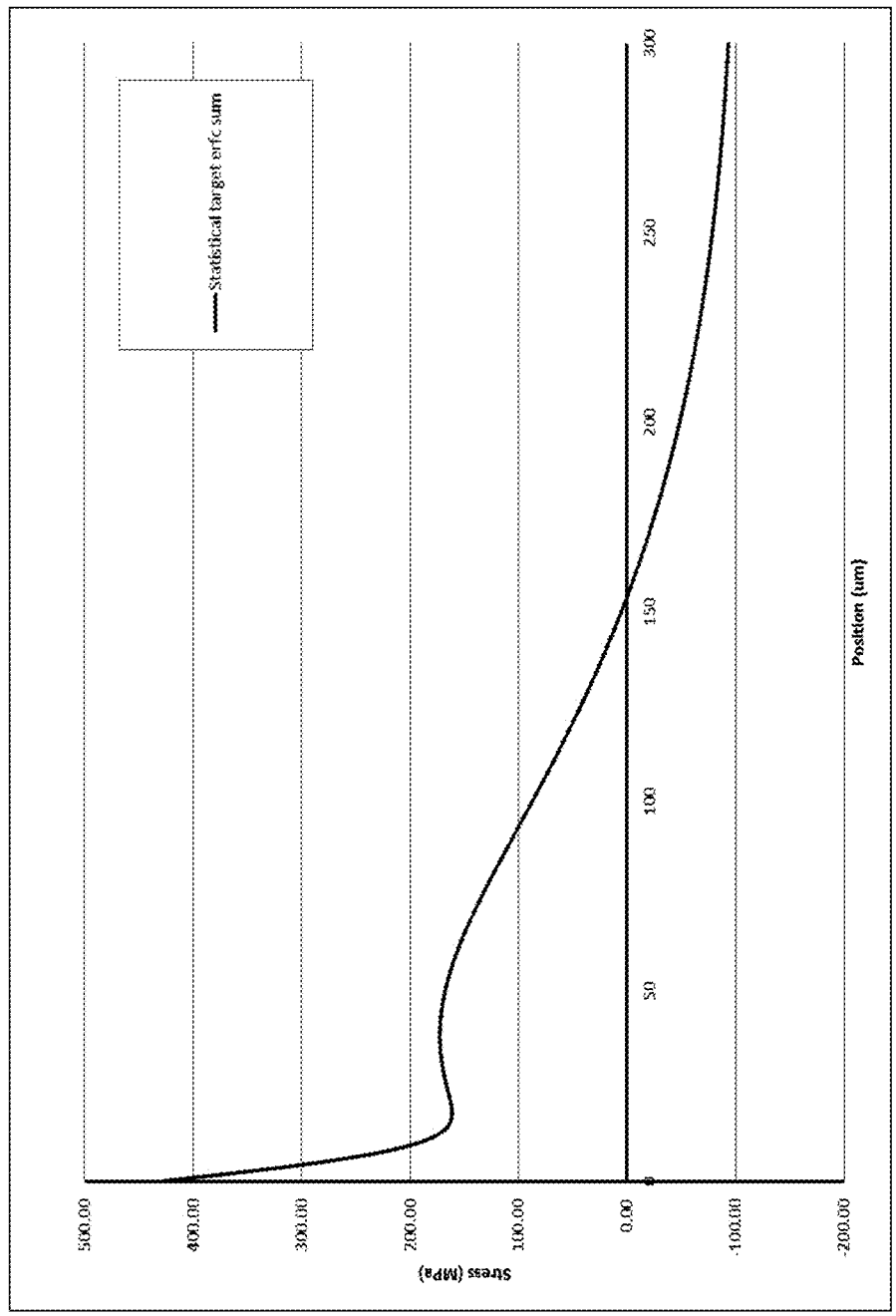
FIG. 4 is a detail of the plot shown in FIG. 3.

FIG. 4 is a detail of the plot of the statistical target for the stress profile for optimum performance shown in FIG. 3, and shows the portion of the stress profile from the surface (0 μm position) to 300 μm within the glass. The target is an idealized profile that was calculated using a statistical model that is based on three error functions (erfc).

Figure 5:
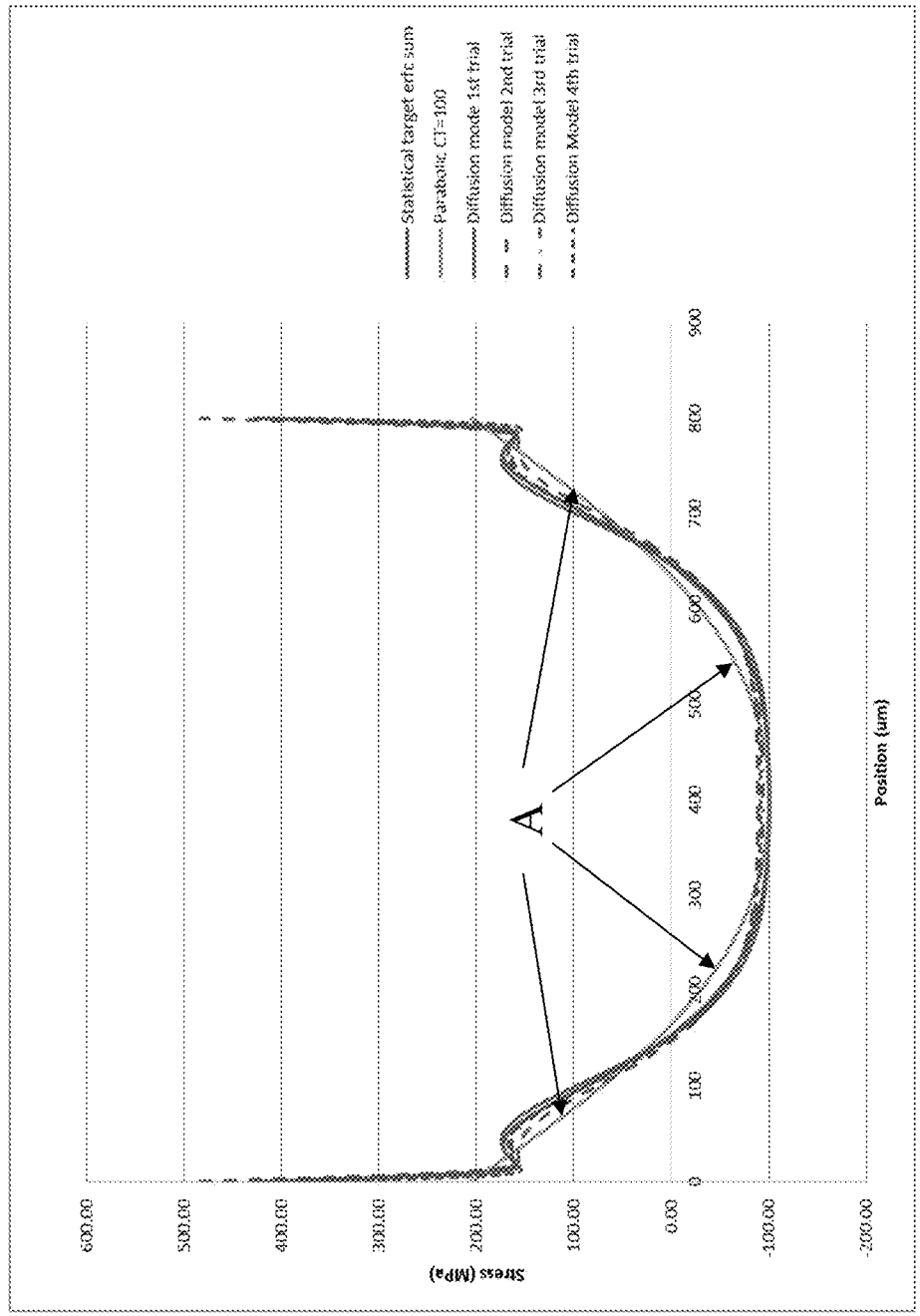
FIG. 5 is a plot of an estimated stress profile obtained by diffusion modeling.
Figure 6:
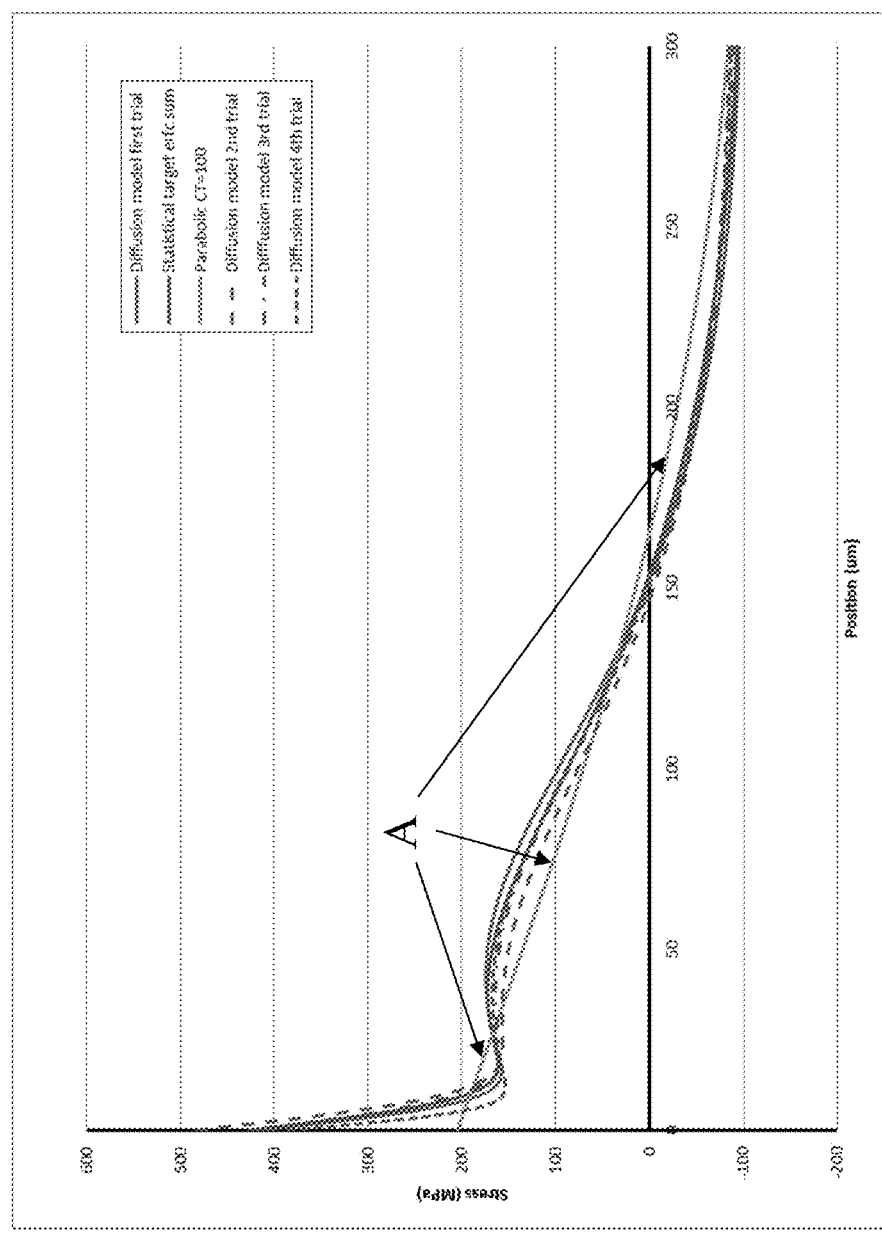
FIG. 6 is a is a detail of the plot shown in FIG. 5.

Diffusion modeling has also been performed on the four ion exchange trials listed in Table 1 that were carried out around the statistical target. The target is an idealized profile that was calculated using a statistical model that is based on three error functions (erfc). The estimated stress profiles obtained by diffusion modeling are plotted in FIG. 5. FIG. 6 shows a detail of the 0-300 μm region of the modeled stress profiles plotted in FIG. 5. A parabolic stress profile (A in FIGS. 5 and 6), which would be obtained if the glass were thermally strengthened or tempered and having a center tension CT of about 100 MPa, is also included in FIGS. 5 and 6 for comparison. The three-step ion exchange process described herein closely follows the modeled profiles shown in the figures, and the parabolic profile for thermally strengthened glass lacks the surface "spike" in compressive stress and local or "buried" maximum of compressive stress.

Figure 10:
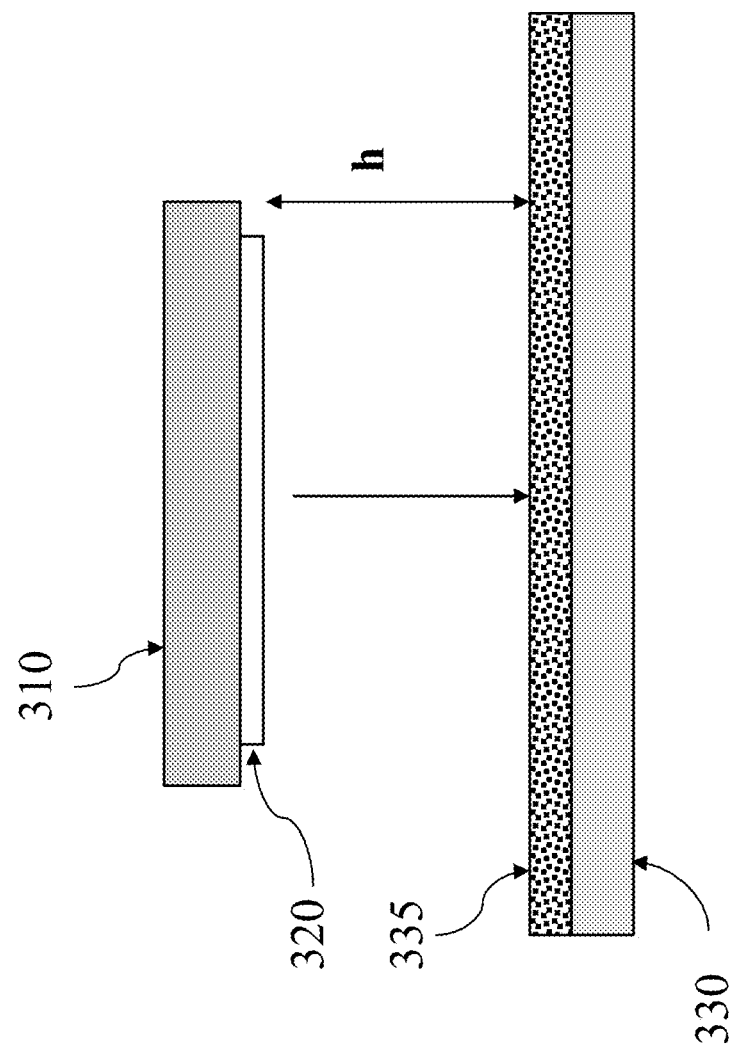
FIG. 10 is a schematic representation of a drop test conducted on chemically strengthened glass samples.

Drop tests were performed on the ion-exchanged samples listed in Table 1 and described hereinabove. A reference sample of identical composition and thickness, which had been ion-exchanged using a two-step ion exchange was also subjected to drop testing. The two-step ion exchange process included a first ion exchange at 450° C. for 7.15 hours in a bath containing 46 to 50 percent $NaNO_3$ by weight, with $KNO_3$ making up the balance of the bath; and a second ion exchange at 390° C. for 12 minutes in a bath containing 0.5 to 3 percent $NaNO_3$ by weight, with $KNO_3$ making up the balance of the bath. A typical drop test is schematically shown in FIG. 10. Each sample of chemically strengthened glass 310 was affixed to a standard test vehicle 320, which approximates the size, mass, and balance of a generic "smart" phone, and dropped from a drop height h onto a sheet of sandpaper 330 having an abrasive surface 335. In some embodiments, the abrasive surface a 180 grit silicon carbide sandpaper surface. The drop height h ranged from about 0.2 meter to 2.2 meters in incremental heights of 0.1 meter. In some embodiments, when the glass article when subjected to a drop from a height of about 220 cm onto a 180 grit silicon carbide sandpaper surface, has at least about a 80% or at least about a 90% survival rate, based on drops of at least 10 samples. Drop testing was first carried out using a 180-grit silicon carbide sandpaper surface. Those samples that survived drop testing on the 180-grit sandpaper surface without visually observable damage (e.g., breakage, cracking scratching, etc.) are then subjected to the same test procedure using a 30-grit sandpaper surface. The drop test results are summarized in Table 2.

TABLE 2

Drop test results for ion exchanged samples listed in Table 1 and reference sample of identical composition and thickness. The reference sample had been ion-exchanged using the two-step ion exchange process described above.

| Sample | 1 | 2 | 3 | 4 | Reference |
|---|---|---|---|---|---|
| 180-grit surface ||||||
| Mean failure height (cm) | 220[1] | 220[1] | 220[2] | 185[3] | 190 |
| 30-grit surface ||||||
| Mean failure height (cm) | 82.4 | 53.3 | 102 | 110 | 37.7 |

[1] All 5 samples tested survived drop from maximum height of 220 cm.
[2] 4 of 5 samples tested survived drop from maximum height of 220 cm.
[3] 2 of 5 samples tested survived drop from maximum height of 220 cm.

As seen in Table 2, all of the three-step or triple ion-exchanged samples performed better than the reference sample. In the 30-grit drop tests, samples that were ion exchanged using parameters set 4 in Table 1 exhibited a mean failure height that is approximately 2.5 times greater than that observed for the reference.

Drop test experiments using a 180-grit sandpaper drop surface were also carried out on samples that were chemically strengthened using different methods. All glasses were of identical compositions (nominal composition of about 58 mol % $SiO_2$, about 16 mol % $Al_2O_3$, about 6 mol % $P_2O_5$, about 17 mol % $Na_2O$, and about 3 mol % MgO) and thickness (0.5 mm). As previously described herein, each sample was dropped onto a sandpaper surface from heights ranging from about 0.2 meter to 2.2 meters in 0.1 meter increments. The results of the drop tests are summarized in Table 3. Sample group A consists of glass samples having a stress profile resulting from a single ion exchange (SIOX) process; sample group B consists of glass samples having a stress profile resulting from a double ion exchange (DIOX) process; sample group C consists of glass samples having a stress profile resulting from the SIOX process followed by thermal annealing; and sample group D consists of glass samples having a stress profile resulting from the SIOX process and having a relatively low compressive stress at the surface.

Figure 7:
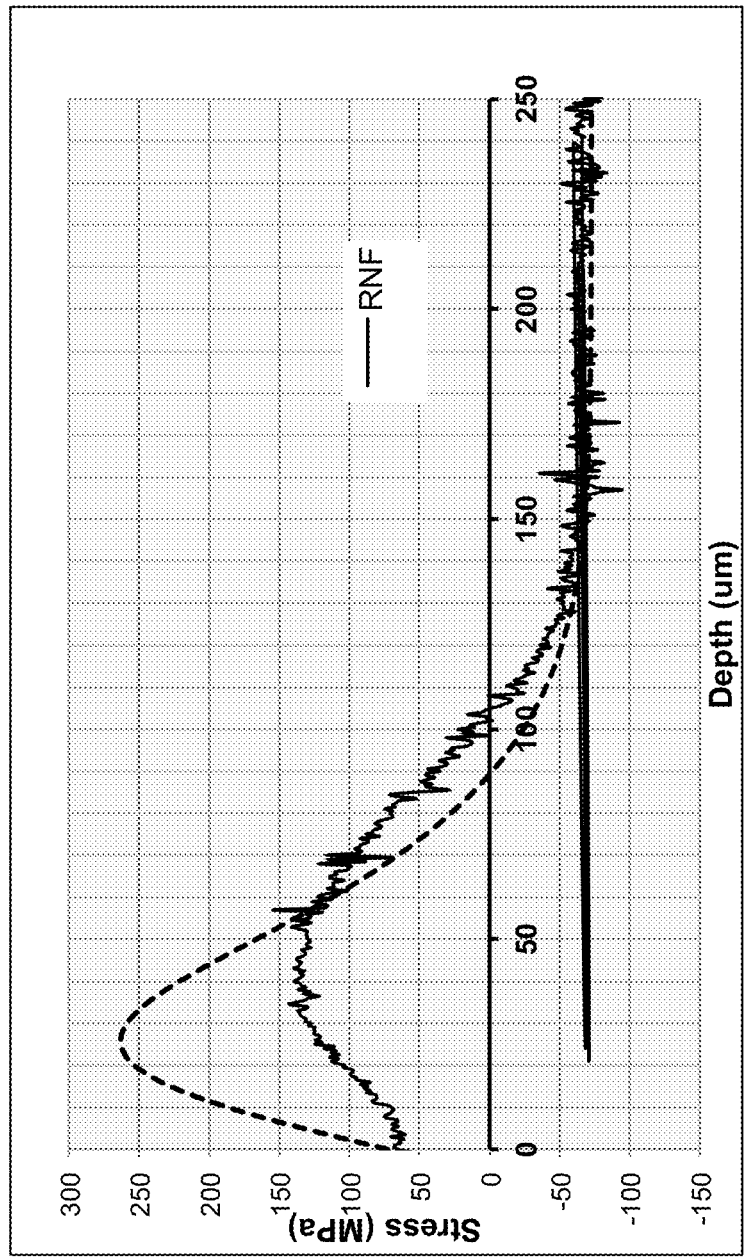
FIG. 7 is a plot of a stress profile obtained using a two-step ion exchange process.

Sample group E consists of glass samples that were ion-exchanged using the first and second ion exchange steps described in Table 1 hereinabove to produce the local or "buried" compressive maximum beneath the surface of the glass. The stress profile of the glasses in sample group E may be approximated by the stress profile shown in FIG. 7, which was obtained using a two-step ion exchange process, which included a first ion exchange for 16 hours at 410° C. in a molten salt bath containing 10 wt % $NaNO_3$ and 90 wt % $KNO_3$ followed by a second ion exchange for 10 hours at 410° C. in a molten salt bath containing 80 wt % $NaNO_3$ and 20 wt % $KNO_3$. The complete stress profile was measured using the RNF system and method previously described hereinabove. The stress profile shown in FIG. 7 exhibits a buried local compressive stress maximum of about 140 MPa at a depth in a range from about 20 μm to about 50 μm and a depth of compression DOC of 105 μm. While the stress at the surface of the stress profile of FIG. 7 is limited, the stress profile exhibits the aspects (buried compressive stress maximum and DOC) of the intermediate or second region B of the glasses described herein and may therefore used to approximate the profile of such glasses in region B.

The average drop height at failure for samples in group E is 90.5 cm, whereas the average drop heights at failure for DIOX glass (sample group B) and SIOX glass (sample group A) are 48 cm and 35.2 cm, respectively. The drop performance of the sample group E glasses is thus nearly 2 times better than the drop performance observed for the stress profile obtained by DIOX and 2.5 times better than the drop performance observed for the stress profile obtained by the SIOX process.

TABLE 3

Drop test results for chemically strengthened samples.

| | A<br>Single<br>ion<br>exchange<br>(SIOX) | B<br>Double-<br>ion<br>exchange<br>(DIOX) | C<br>SIOX<br>and<br>thermal<br>anneal | D<br>SIOX<br>with low<br>surface<br>CS | E<br>Three-<br>step ion<br>exchange<br>without<br>spike[1] |
|---|---|---|---|---|---|
| Mean failure height (cm) | 35.2 | 48 | 142 | 72.5 | 90.5 |

[1]Results obtained following first two steps (first ion exchange for 16 hours at 410° C. in a 10 wt % NaNO$_3$ and 90 wt % KNO$_3$ bath followed by second ion exchange for 10 hours at 410° C. in a 80 wt % NaNO$_3$/20 wt % KNO$_3$) of three step ion exchange process.

Figure 8:
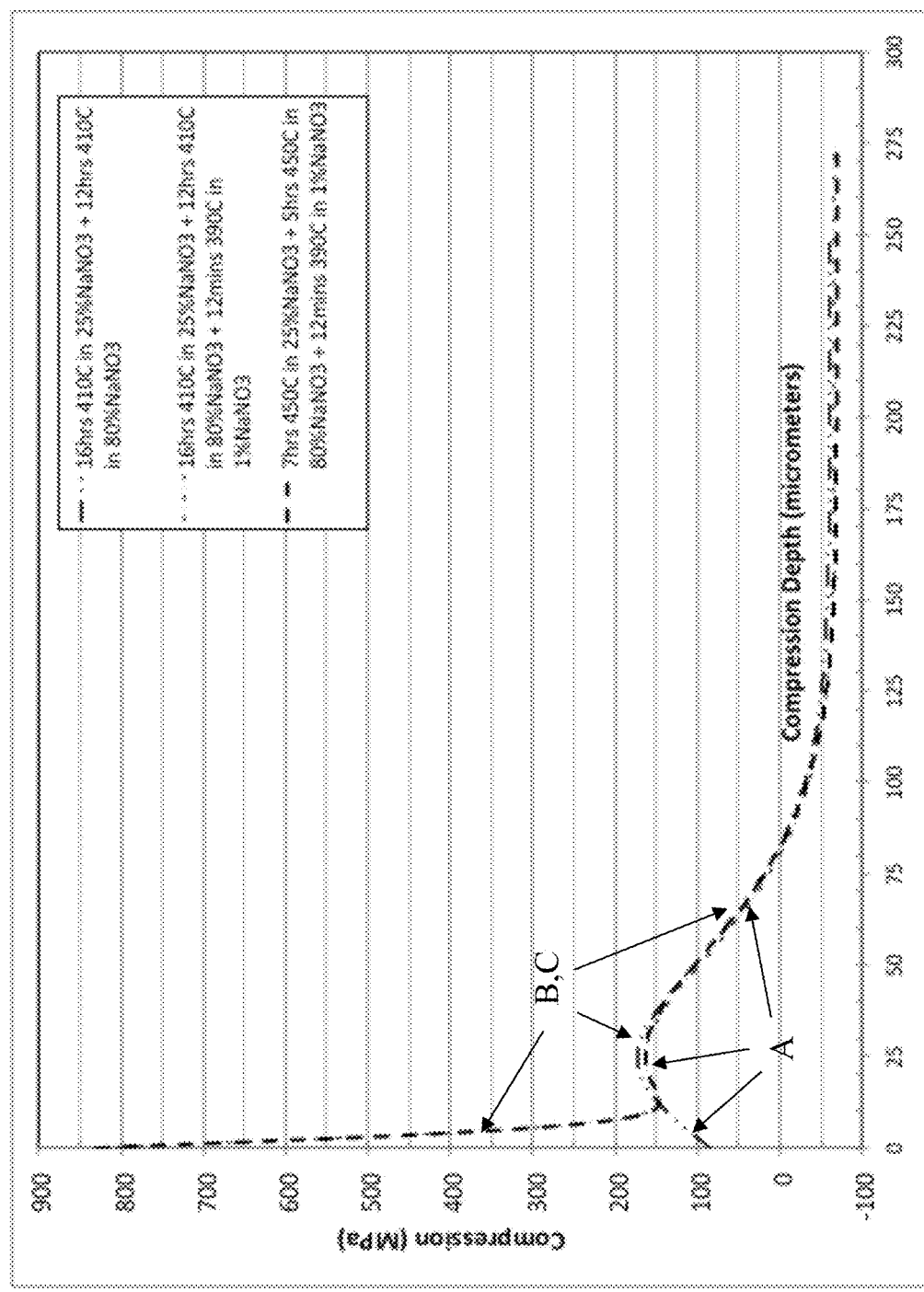
FIG. 8 is a plot demonstrating how the third step of the three-step ion exchange process may be used to develop a compression spike near the surface.

FIG. 8 is a plot showing how the third step of the three-step ion exchange process may be used to develop a sharp compression "spike" at and immediately adjacent to the surface while maintaining the overall stress profile below the frangibility limit of the glass. FIG. 8 includes several estimated stress profiles for a thickness of 0.55 mm that may provide improved performance over the two-step or dual-IOX process. A dual-IOX (DIOX) profile for this thickness (A) is also shown in FIG. 8 for comparison. The resulting stress profiles have a DOC of greater than 80 µm, a compressive stress spike having a maximum value ranging from about 600 MPa to about 850 MPa and a spike depth less than 20 µm, followed by an intermediate region from about 20 µm and about 50 µm, where the compressive stress is greater than that provided by a dual-IOX non-frangible recipe for the same glass with the same center tension CT.

The glasses described herein are ion exchangeable alkali aluminosilicate glasses. In one embodiment, the alkali aluminosilicate glass comprises $SiO_2$, $Al_2O_3$, $P_2O_5$, and at least one alkali metal oxide ($R_2O$), wherein $0.75 \leq [(P_2O_5(\text{mol \%}) + R_2O(\text{mol \%}))/M_2O_3 \text{ (mol \%)}] \leq 1.2$, where $M_2O_3 = Al_2O_3 + B_2O_3$. In some embodiments, the alkali aluminosilicate glass comprises or consists essentially of: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$ and, in certain embodiments, from about 40 to about 64 mol % $SiO_2$; from 0 mol % to about 8 mol % $B_2O_3$; from about 16 mol % to about 28 mol % $Al_2O_3$; from about 2 mol % to about 12 mol % $P_2O_5$; and from about 10 to about 16 mol % $R_2O$, or from about 12 mol % to about 16 mol % $R_2O$, where $R_2O$ includes $Na_2O$. In some embodiments, 11 mol % ≤ $M_2O_3$ ≤ 30 mol %; in some embodiments, 13 mol % ≤ $R_xO$ ≤ 30 mol %, where $R_xO$ is the sum of alkali metal oxides, alkaline earth metal oxides, and transition metal monoxides present in the glass. In some embodiments, the glass is lithium-free. In other embodiments, the glass may comprise up to about 10 mol % $Li_2O$, or up to about 7 mol % $Li_2O$. These glasses are described in U.S. Pat. No. 9,346,703, entitled "Ion Exchangeable Glass with Deep Compressive Layer and High Damage Threshold," filed Nov. 28, 2011, by Dana Craig Bookbinder et al. and claiming priority from U.S. Provisional Patent Application No. 61/417,941, filed on Nov. 30, 2010, and having the same title, the contents of which are incorporated herein by reference in their entirety.

In certain embodiments, the alkali aluminosilicate glass comprises at least about 2 mol % $P_2O_5$, or at least about 4 mol % $P_2O_5$, wherein $(M_2O_3(\text{mol \%})/R_xO(\text{mol \%})) < 1$, wherein $M_2O_3 = Al_2O_3 + B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, $MgO$, $CaO$, $SrO$, $BaO$, and $ZnO$. In some embodiments, the glass is lithium-free and comprises or consists essentially of from about 40 mol % to about 70 mol % $SiO_2$; from about 11 mol % to about 25 mol % $Al_2O_3$; from about 2 mol % $P_2O_5$, or from about 4 mol % to about 15 mol % $P_2O_5$; from about 10 mol % $Na_2O$, or from about 13 mol % to about 25 mol % $Na_2O$; from about 13 to about 30 mol % $R_xO$, where $R_xO$ is the sum of the alkali metal oxides, alkaline earth metal oxides, and transition metal monoxides present in the glass; from about 11 mol % to about 30 mol % $M_2O_3$, where $M_2O_3 = Al_2O_3 + B_2O_3$; from 0 mol % to about 1 mol % $K_2O$; from 0 mol % to about 4 mol % $B_2O_3$, and 3 mol % or less of one or more of $TiO_2$, $MnO$, $Nb_2O_5$, $MoO_3$, $Ta_2O_5$, $WO_3$, $ZrO_2$, $Y_2O_3$, $La_2O_3$, $HfO_2$, $CdO$, $SnO_2$, $Fe_2O_3$, $CeO_2$, $As_2O_3$, $Sb_2O_3$, $Cl$, and $Br$; wherein $1.3 < [(P_2O_5 + R_2O)/M_2O_3] \leq 2.3$, where $R_2O$ is the sum of monovalent cation oxides present in the glass. In some embodiments, the glass is lithium-free and, in other embodiments, comprise up to about 10 mol % $Li_2O$, or up to about 7 mol % $Li_2O$. The glass is described in U.S. Pat. No. 9,156,724 by Timothy M. Gross, entitled "Ion Exchangeable Glass with High Crack Initiation Threshold," filed Nov. 15, 2012, and U.S. Pat. No. 8,756,262 by Timothy M. Gross, entitled "Ion Exchangeable Glass with High Crack Initiation Threshold," filed Nov. 15, 2012, both claiming priority to U.S. Provisional Patent Application No. 61/560,434 filed Nov. 16, 2011. The contents of the above patent and applications are incorporated herein by reference in their entirety.

In some embodiments, the alkali aluminosilicate glasses described herein are formable by down-draw processes that are known in the art, such as slot-draw and fusion-draw processes.

The fusion-draw process is an industrial technique that has been used for the large-scale manufacture of thin glass sheets. Compared to other flat glass manufacturing techniques, such as the float or slot-draw processes, the fusion-draw process yields thin glass sheets with superior flatness and surface quality. As a result, the fusion-draw process has become the dominant manufacturing technique in the fabrication of thin glass substrates for liquid crystal displays, as well as for cover glass for personal electronic devices such as notebooks, entertainment devices, tables, laptops, and the like.

The fusion-draw process involves the flow of molten glass over a trough known as an "isopipe," which is typically made of zircon or another refractory material. The molten glass overflows the top of the isopipe from both sides, meeting at the bottom of the isopipe to form a single sheet where only the interior of the final sheet has made direct contact with the isopipe. Since neither exposed surface of the final glass sheet has made contact with the isopipe material during the draw process, both outer surfaces of the glass are of pristine quality and do not require subsequent finishing.

The glasses described herein are chemically compatible with the zircon isopipe and other hardware used in down-draw processes; i.e., the glass melt does not appreciably react to cause zircon to decompose, giving rise to solid inclusions such as zirconia in the drawn glass. In such embodiments, $T^{breakdown}$—the temperature at which zircon breaks down and reacts with the glass melt—is greater than $T^{35kP}$, the temperature at which the viscosity of the glass or glass melt is 35 kiloPoise (kP); i.e., $T^{breakdown} > T^{35kP}$.

In order to be fusion-drawable, a glass must have a sufficiently high liquidus viscosity (i.e., the viscosity of a molten glass at the liquidus temperature). In some embodiments, the glasses described herein have a liquidus viscosity of at least about 100 kiloPoise (kP) or, in some embodiments, at least about 130 kP. In some embodiments, the liquidus of the glass is at least about 200 kilopoise (kP) and, in other embodiments, at least about 500 kP.

Figure 9:
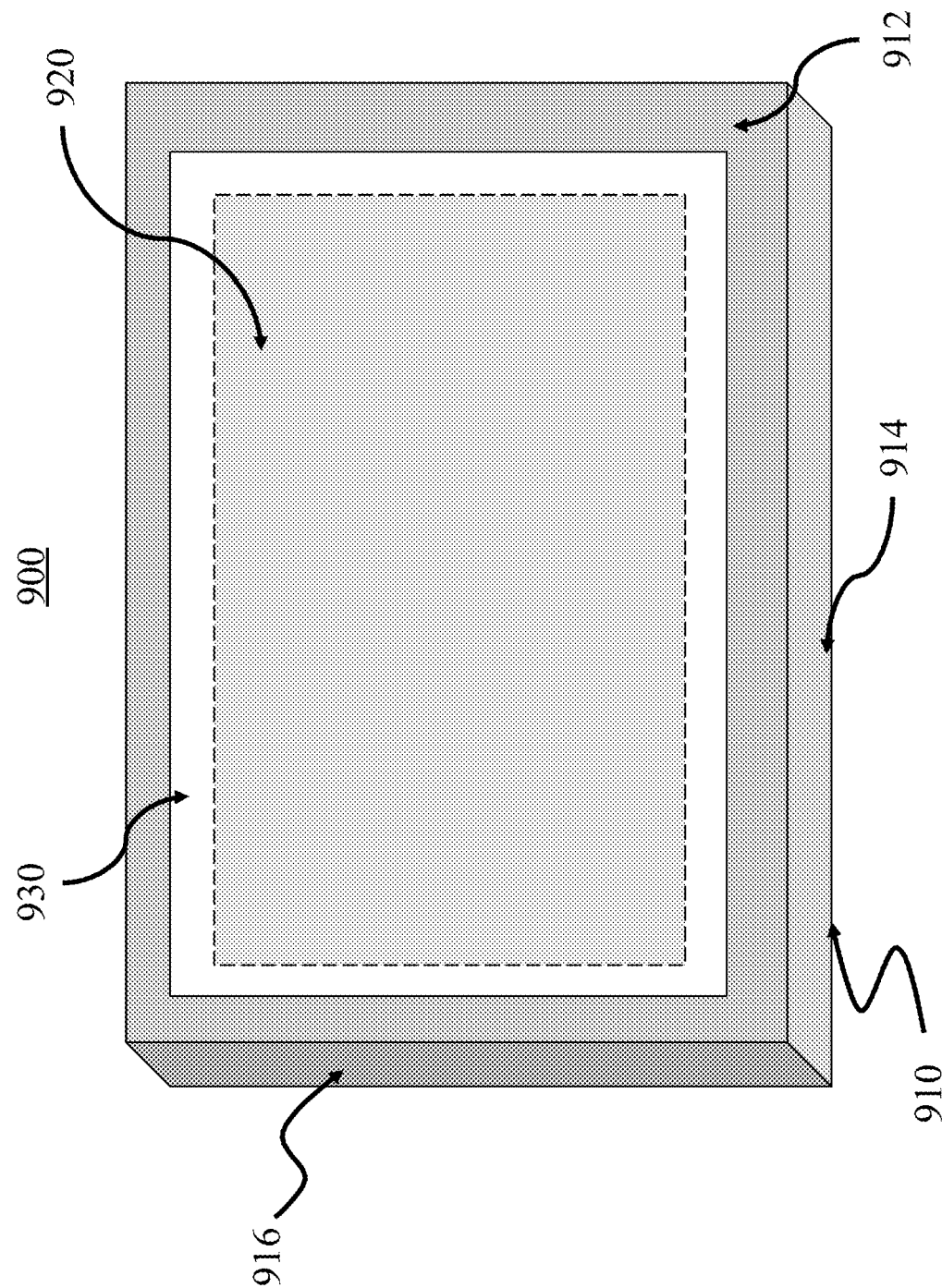
FIG. 9 is a schematic view of a consumer electronic product.

In some embodiments, the glass article and ion-exchanged glass articles described herein form a portion of a consumer electronic product, such as a cellular phone or smart phone, laptop computer, tablet, or the like. A schematic view of a consumer electronic product (e.g., a smart phone) is shown in FIG. 9. Consumer electronic product 900 typically comprises a housing 910 having a front surface 912, a back surface 914, and side surfaces 916; and includes electrical components (not shown), which are at least partially internal to the housing 910. The electrical components include at least a power source, a controller, a memory, and a display 920. The display 920 is, in some embodiments, provided at or adjacent the front surface 912 of the housing. A cover glass 930, which comprises the ion-exchanged glass described herein, is provided at or over the front surface 912 of the housing 900 such that the cover glass 930 is positioned over the display 920 and protects the display 920 from damage caused by impact or damage. In some embodiments, the display 920 and/or cover glass 930 are bendable. In some embodiments, at least one of the cover substrate 930 or a portion of housing 910 may include any of the strengthened articles disclosed herein.

Aspect (1) includes a glass article having a thickness t, the glass article comprising a compressive layer extending from a surface of the glass article to a depth of compression DOC, wherein stress in the glass article varies as a function of the thickness t to form a stress profile, the stress profile comprising:

a first region extending from the surface to a depth d1 into the glass, wherein d1≤0.025t and wherein the first region has a maximum compressive stress CS1 at the surface, wherein the maximum compressive stress CS1 is at least about 280 MPa;

a second region extending from a depth of at least d1 to a second depth d2, wherein d2≤0.0625t, wherein the second region has a compressive stress maximum CS2 and wherein the stress profile increases from a compressive stress at the depth d1 to the compressive stress maximum CS2 and decreases from the compressive stress maximum CS2 to a second compressive stress at second depth d2; and a third region extending from a third depth d3 in the glass article to the depth of compression DOC, wherein d2≤d3 and DOC≥0.10t.

Aspect (2) according to aspect (1), wherein the glass article has a Young's modulus in a range from about 50 GPa to about 120 GPa.

Aspect (3) according to aspect (1) or (2), wherein 125 MPa≤CS2≤250 MPa or 50 MPa≤CS2≤300 MPa.

Aspect (4) according to any of the preceding aspects, wherein the stress profile includes a tensile region extending from the depth of compression DOC to a center of the glass article at t/2, wherein the tensile region has a maximum tensile stress of up to about 100 MPa at t/2.

Aspect (5) according to any of the preceding aspects, wherein 50 μm≤t≤3000 μm.

Aspect (6) according to any of the preceding aspects, wherein 0.15t≤DOC≤0.25t.

Aspect (7) according to any of the preceding aspects, wherein the glass article, when subjected to a drop test from a height of about 220 cm onto a 180 grit silicon carbide sandpaper surface, has at least about a 90% survival rate, based on drops of at least 10 samples.

Aspect (8) according to any of the preceding aspects, wherein the glass article comprises an alkali aluminosilicate glass.

Aspect (9) according aspect (8), wherein the alkali aluminosilicate glass comprises at least about 4 mol % $P_2O_5$, wherein ($M_2O_3$(mol %)/$R_xO$(mol %))<1, wherein $M_2O_3$=$Al_2O_3$+$B_2O_3$, and wherein $R_xO$ is the sum of monovalent and divalent cation oxides present in the alkali aluminosilicate glass.

Aspect (10) according to aspect (8), wherein the alkali aluminosilicate glass comprises: from about 40 mol % to about 70 mol % $SiO_2$; from about 11 mol % to about 25 mol % $Al_2O_3$; from about 2 mol % to about 15 mol % $P_2O_5$; from about 10 mol % to about 25 mol % $Na_2O$; from about 10 to about 30 mol % $R_xO$, where $R_xO$ is the sum of the alkali metal oxides, alkaline earth metal oxides, and transition metal monoxides present in the glass.

Aspect (11) according to any of the preceding aspects, wherein the glass article is fusion formable.

Aspect (12) includes a consumer electronic device comprising:

a housing having a front surface, a back surface, and side surface;

electrical components provided at least partially within the housing, the electrical components including at least a controller, a memory, and a display, the display being provided at or adjacent to a front surface of the housing; and a cover glass dispose over the display, wherein at least one of a portion of the housing or the cover glass comprises the glass article of any of the preceding aspects.

Aspect (13) includes a glass article having a thickness t and a Young's modulus in a range from about 50 GPa to about 120 GPa, the glass article comprising a compressive layer extending from a surface of the glass to a depth of compression DOC, wherein stress in the glass article varies as a function of the thickness t to form a stress profile, the stress profile comprising:

a first region extending from the surface to a depth d1 into the glass article, wherein d1≤20 μm and wherein the first region has a maximum compressive stress CS1 at the surface, wherein the maximum compressive stress CS1 is at least about 280 MPa;

a second region extending from a depth of at least d1 to a second depth d2, wherein 20 μm≤d2≤50 μm, wherein the second region has a compressive stress maximum CS2 and wherein the stress profile increases from a compressive stress at the depth d1 to the compressive stress maximum CS2 and decreases from the compressive stress maximum CS2 to a second compressive stress at second depth d2; and a third region extending from a third depth d3 in the glass article to the depth of compression DOC, wherein d2≤d3 and DOC≥0.15t.

Aspect (14) according to aspect (13), wherein 125 MPa≤CS2≤250 MPa or 50 MPa≤CS2≤300 MPa.

Aspect (15) according to aspect (13) or (14), wherein the stress profile includes a tensile region extending from the depth of compression DOC to a center of the glass article at t/2, wherein the tensile region has a maximum tensile stress of up to about 100 MPa at t/2.

Aspect (16) according to any of aspects (13)-(15), wherein 50 μm≤t≤3000 μm.

Aspect (17) according to any of aspects (13)-(16), wherein 0.15t≤DOC≤0.25t.

Aspect (18) according to any of aspects (13)-(17), wherein the glass article, when subjected to a drop test from a height of about 220 cm onto a 180 grit silicon carbide sandpaper surface, has at least about a 90% survival rate, based on drops of at least 10 samples.

Aspect (19) according to any of aspects (13)-(18), wherein the glass article comprises an alkali aluminosilicate glass.

Aspect (20) according to aspect (19), wherein the alkali aluminosilicate glass comprises at least about 4 mol % $P_2O_5$, wherein $(M_2O_3(mol \%)/R_xO(mol \%))<1$, wherein $M_2O_3=Al_2O_3+B_2O_3$, and wherein $R_xO$ is the sum of monovalent and divalent cation oxides present in the alkali aluminosilicate glass.

Aspect (21) according to aspect (19), wherein the alkali aluminosilicate glass comprises: from about 40 mol % to about 70 mol % $SiO_2$; from about 11 mol % to about 25 mol % $Al_2O_3$; from about 2 mol % to about 15 mol % $P_2O_5$; from about 10 mol % to about 25 mol % $Na_2O$; from about 10 to about 30 mol % $R_xO$, where $R_xO$ is the sum of the alkali metal oxides, alkaline earth metal oxides, and transition metal monoxides present in the glass.

Aspect (22) according to any one of aspects (13)-(21), wherein the glass is fusion formable.

Aspect (23) includes a consumer electronic device comprising:
a housing having a front surface, a back surface, and side surface;
electrical components provided at least partially within the housing, the electrical components including at least a controller, a memory, and a display, the display being provided at or adjacent to a front surface of the housing; and
a cover glass dispose over the display,
wherein at least one of a portion of the housing or the cover glass comprises the glass article of any of aspects (13)-(22).

Aspect (24) includes a glass article having a thickness t and a Young's modulus in a range from about 50 GPa to about 120 GPa, the glass article comprising a compressive layer extending from a surface of the glass article to a depth of compression DOC, wherein stress in the glass article varies as a function of the thickness t to form a stress profile, the stress profile comprising:
a first region extending from the surface to a depth d1 into the glass article, wherein $d1 \leq 0.025t$ and wherein the first region has a maximum compressive stress CS1 at the surface, wherein the maximum compressive stress CS1 is at least about 280 MPa;
a second region extending from a depth of at least d1 to a second depth d2, wherein $d2 \leq 0.0625t$, wherein the second region has a compressive stress maximum CS2, wherein 50 MPa $\leq$ CS2 $\leq$ 300 MPa or 125 MPa $\leq$ CS2 $\leq$ 250 MPa, wherein the stress profile increases from a compressive stress at the depth d1 to the compressive stress maximum CS2 and decreases from the compressive stress maximum CS2 to a second compressive stress at second depth d2; and
a third region extending from a third depth d3 in the glass article to the depth of compression DOC, wherein $d2 \leq d3$ and DOC $\geq 0.15t$, Aspect (25) according to aspect (24), wherein the glass article, when subjected to a drop test from a height of about 220 cm onto a 180 grit silicon carbide sandpaper surface, has at least about a 90% survival rate, based on drops of at least 5 samples.

Aspect (26) according to aspect (24) or (25), wherein the stress profile includes a tensile region extending from the depth of compression DOC to a center of the glass article at t/2, wherein the tensile region has a maximum tensile stress of up to about 100 MPa at t/2.

Aspect (27) according to any of aspects (24)-(26), wherein 50 μm $\leq$ t $\leq$ 3000 μm.

Aspect (28) according to any of aspects (24)-(27), wherein $0.15t \leq DOC \leq 0.25t$.

Aspect (29) according to any of aspects (24)-(28), wherein the glass article, when subjected to a drop test from a height of about 220 cm onto a 180 grit silicon carbide sandpaper surface, has at least about a 90% survival rate, based on drops of at least 10 samples.

Aspect (30) according to any of aspects (24)-(29), wherein the glass article comprises an alkali aluminosilicate glass.

Aspect (31) according to aspect (30), wherein the alkali aluminosilicate glass comprises at least about 4 mol % $P_2O_5$, wherein $(M_2O_3(mol \%)/R_xO(mol \%))<1$, wherein $M_2O_3=Al_2O_3+B_2O_3$, and wherein $R_xO$ is the sum of monovalent and divalent cation oxides present in the alkali aluminosilicate glass.

Aspect (32) according to aspect (30), wherein the alkali aluminosilicate glass comprises: from about 40 mol % to about 70 mol % $SiO_2$; from about 11 mol % to about 25 mol % $Al_2O_3$; from about 2 mol % to about 15 mol % $P_2O_5$; from about 10 mol % to about 25 mol % $Na_2O$; from about 10 to about 30 mol % $R_xO$, where $R_xO$ is the sum of the alkali metal oxides, alkaline earth metal oxides, and transition metal monoxides present in the glass.

Aspect (33) according to any of aspects (24)-(32), wherein the glass is fusion formable.

Aspect (34) includes a consumer electronic device comprising:
a housing having a front surface, a back surface, and side surface;
electrical components provided at least partially within the housing, the electrical components including at least a controller, a memory, and a display, the display being provided at or adjacent to a front surface of the housing; and
a cover glass dispose over the display,
wherein at least one of a portion of the housing or the cover glass comprises the glass article of any of aspects (24)-(33).

Aspect (35) includes a method of strengthening a glass, the glass comprising first alkali cations and having a first surface, a second surface opposite the first surface, and a thickness t and a center at t/2, wherein the glass article has a stress profile comprising a first region extending from the first surface to a depth d1 into the glass, wherein $d1 \leq 0.025t$ and having a maximum compressive stress CS1 at the surface, a second region extending from a depth of at least d1 to a second depth d2, wherein $d2 \leq 0.0625t$ and having a compressive stress maximum CS2, and a third region extending from a third depth d3 in the glass to the depth of compression DOC, wherein $d2 \leq d3$, the method comprising:
a. immersing the glass in a first ion exchange bath, the first ion exchange bath comprising a first alkali cation and a second alkali cation, wherein the first ion exchange bath comprises from about 20 wt % to about 30 wt % of at least one salt of the first alkali cation, the second alkali cation being different from the first alkali cation, wherein the second alkali cation from the ion exchange bath replace the first alkali cation in the glass article;
b. immersing the glass in a second ion exchange bath after immersing the glass article in the first ion exchange bath, the second ion exchange bath comprising the first alkali cation and the second alkali cation, wherein the second ion exchange bath comprises from about 60 wt % to about 80 wt % of at least one salt of the first alkali cation; and c. immersing the glass in a third ion exchange bath after immersing the glass article in the second ion exchange bath, the second ion exchange bath comprising the first alkali cation and the second alkali cation, wherein the third ion exchange bath comprises from about 75 wt % to about 100 wt % of at least one salt of the second alkali cation.

Aspect (36) according to aspect (35), further comprising a thermal diffusion step following at least one of the step of immersing the glass article in the second ion exchange bath in the first ion exchange bath and the step of immersing, the thermal diffusion step comprising heating the glass to a temperature in a range from about 400° C. to about 500° C.

Aspect (37) according to aspect (35) or (36), wherein the thermal diffusion step comprises heating the glass for at least about 16 hours at the temperature.

Aspect (38) according to any of aspects (35)-(37), wherein the maximum compressive stress CS1 is at least about 280 MPa.

Aspect (39) according to any of aspects (35)-(38), wherein 125 MPa≤CS2≤250 MPa or 50 MPa≤CS2≤300 MPa.

Aspect (40) according to any of aspects (35)-(39), wherein the glass article comprises an alkali aluminosilicate glass.

Aspect (41) according to aspect (40), wherein the alkali aluminosilicate glass comprises at least about 4 mol % $P_2O_5$, wherein $(M_2O_3(mol\ \%)/R_xO(mol\ \%))<1$, wherein $M_2O_3=Al_2O_3+B_2O_3$, and wherein $R_xO$ is the sum of monovalent and divalent cation oxides present in the alkali aluminosilicate glass.

Aspect (42) according to aspect (41), wherein the alkali aluminosilicate glass comprises: from about 40 mol % to about 70 mol % $SiO_2$; from about 11 mol % to about 25 mol % $Al_2O_3$; from about 2 mol % to about 15 mol % $P_2O_5$; from about 10 mol % to about 25 mol % $Na_2O$; from about 10 to about 30 mol % $R_xO$, where $R_xO$ is the sum of the alkali metal oxides, alkaline earth metal oxides, and transition metal monoxides present in the glass.

Aspect (43) according to any of aspects (35)-(42), further comprising fusion forming the glass article.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass article having a thickness t, the glass article comprising a compressive layer extending from a surface of the glass article to a depth of compression DOC, wherein stress in the glass article varies as a function of the thickness t to form a stress profile, the stress profile comprising:
a first region extending from the surface to a depth d1 into the glass, wherein d1≤0.025t and wherein the first region has a maximum compressive stress CS1 at the surface, wherein the maximum compressive stress CS1 is at least about 280 MPa;
a second region extending from a depth of at least d1 to a second depth d2, wherein d2≤0.0625t, wherein the second region has a compressive stress maximum CS2 and wherein the stress profile increases from a compressive stress at the depth d1 to the compressive stress maximum CS2 and decreases from the compressive stress maximum CS2 to a second compressive stress at second depth d2;
a third region extending from a third depth d3 in the glass article to the depth of compression DOC, wherein d2≤d3 and DOC≥0.15t; and
a tensile region extending from the depth of compression DOC to a center of the glass article at t/2, wherein the tensile region has a maximum tensile stress of up to about 100 MPa at t/2.

2. The glass article of claim 1, wherein the glass article has a Young's modulus in a range from about 50 GPa to about 120 GPa.

3. The glass article of claim 1, wherein 50 μm≤t≤3000 μm.

4. The glass article of claim 1, wherein DOC≤0.25t.

5. The glass article of claim 1, wherein the glass article, when subjected to a drop test from a height of about 220 cm onto a 180 grit silicon carbide sandpaper surface, has at least about a 90% survival rate, based on drops of at least 10 samples.

6. The glass article of claim 1, wherein the glass article comprises an alkali aluminosilicate glass.

7. The glass article of claim 6, wherein the alkali aluminosilicate glass comprises at least about 4 mol % $P_2O_5$, wherein $(M_2O_3(mol\ \%)/R_xO(mol\ \%))<1$, wherein $M_2O_3=Al_2O_3+B_2O_3$, and wherein $R_xO$ is the sum of monovalent and divalent cation oxides present in the alkali aluminosilicate glass.

8. The glass article of claim 6, wherein the alkali aluminosilicate glass comprises: from about 40 mol % to about 70 mol % $SiO_2$; from about 11 mol % to about 25 mol % $Al_2O_3$; from about 2 mol % to about 15 mol % $P_2O_5$; from about 10 mol % to about 25 mol % $Na_2O$; from about 10 to about 30 mol % $R_xO$, where $R_xO$ is the sum of the alkali metal oxides, alkaline earth metal oxides, and transition metal monoxides present in the glass.

9. The glass article of claim 1, wherein the glass article is fusion formable.

10. The glass article of claim 1, wherein 125 MPa≤CS2≤250 MPa.

11. A consumer electronic device comprising:
a housing having a front surface, a back surface, and side surface;
electrical components provided at least partially within the housing, the electrical components including at least a controller, a memory, and a display, the display being provided at or adjacent to a front surface of the housing; and
a cover glass dispose over the display,
wherein at least one of a portion of the housing or the cover glass comprises the glass article of claim 1.

12. A glass article having a thickness t and a Young's modulus in a range from about 50 GPa to about 120 GPa, the glass article comprising a compressive layer extending from a surface of the glass to a depth of compression DOC, wherein stress in the glass article varies as a function of the thickness t to form a stress profile, the stress profile comprising:
a first region extending from the surface to a depth d1 into the glass article, wherein d1≤20 μm and wherein the first region has a maximum compressive stress CS1 at the surface, wherein the maximum compressive stress CS1 is at least about 280 MPa;
a second region extending from a depth of at least d1 to a second depth d2, wherein 20 μm≤d2≤50 μm, wherein the second region has a compressive stress maximum CS2 and wherein the stress profile increases from a compressive stress at the depth d1 to the compressive stress maximum CS2 and decreases from the compressive stress maximum CS2 to a second compressive stress at second depth d2; and a third region extending from a third depth d3 in the glass article to the depth of compression DOC, wherein d2≤d3 and DOC>0.15t.

13. The glass article of claim 12, wherein the stress profile includes a tensile region extending from the depth of compression DOC to a center of the glass article at t/2, wherein the tensile region has a maximum tensile stress of up to about 100 MPa at t/2.

14. The glass article of claim 12, wherein 50 μm≤t≤3000 μm.

15. The glass article of claim 12, wherein 0.15t≤DOC≤0.25t.

16. The glass article of claim 12, wherein the glass article, when subjected to a drop test from a height of about 220 cm onto a 180 grit silicon carbide sandpaper surface, has at least about a 90% survival rate, based on drops of at least 10 samples.

17. The glass article of claim 12, wherein the glass article comprises an alkali aluminosilicate glass.

18. The glass article of claim 17, wherein the alkali aluminosilicate glass comprises at least about 4 mol % $P_2O_5$, wherein ($M_2O_3$(mol %)/$R_xO$(mol %))<1, wherein $M_2O_3=Al_2O_3+B_2O_3$, and wherein $R_xO$ is the sum of monovalent and divalent cation oxides present in the alkali aluminosilicate glass.

19. The glass article of claim 17, wherein the alkali aluminosilicate glass comprises: from about 40 mol % to about 70 mol % $SiO_2$; from about 11 mol % to about 25 mol % $Al_2O_3$; from about 2 mol % to about 15 mol % $P_2O_5$; from about 10 mol % to about 25 mol % $Na_2O$; from about 10 to about 30 mol % $R_xO$, where $R_xO$ is the sum of the alkali metal oxides, alkaline earth metal oxides, and transition metal monoxides present in the glass.

20. The glass article of claim 12, wherein the glass is fusion formable.

21. The glass article of claim 12, wherein 125 MPa≤CS2≤250 MPa.

22. A consumer electronic device comprising:

a housing having a front surface, a back surface, and side surface;

electrical components provided at least partially within the housing, the electrical components including at least a controller, a memory, and a display, the display being provided at or adjacent to a front surface of the housing; and a cover glass dispose over the display, wherein at least one of a portion of the housing or the cover glass comprises the glass article of claim 12.

* * * * *

UNITED STATES PATENT AND TRADEMARK OFFICE
CERTIFICATE OF CORRECTION

| | |
|---|---|
| PATENT NO. | : 11,059,744 B2 |
| APPLICATION NO. | : 15/617302 |
| DATED | : July 13, 2021 |
| INVENTOR(S) | : Pascale Oram et al. |

It is certified that error appears in the above-identified patent and that said Letters Patent is hereby corrected as shown below:

On the Title Page

In Column 2, item (57), Abstract, Line 14, delete "DOC≤0.15t." and insert -- DOC≥0.15t. --, therefor.

In the Specification

In Column 19, Line 7, Claim 12, delete "DOC>0.15t." and insert -- DOC≥0.15t. --, therefor.

Signed and Sealed this
Nineteenth Day of April, 2022

Katherine Kelly Vidal
*Director of the United States Patent and Trademark Office*